United States Patent [19]

Sander

[11] 4,092,680
[45] May 30, 1978

[54] APPARATUS FOR INDICATING THE FARTHEST ADVANCE POSITION OF A BI-DIRECTIONALLY MOVABLE MEDIUM

[75] Inventor: Willy M. Sander, Stamford, Conn.

[73] Assignee: Dictaphone Corporation, Rye, N.Y.

[21] Appl. No.: 722,142

[22] Filed: Sep. 10, 1976

[51] Int. Cl.² .................. G11B 27/14; G11B 27/20; G11B 19/06
[52] U.S. Cl. ........................... 360/72; 179/100.1 DR
[58] Field of Search .................. 360/72, 74, 71, 90, 360/93, 96, 137; 179/100.1 DR

[56] References Cited

U.S. PATENT DOCUMENTS

| | | | |
|---|---|---|---|
| 3,467,791 | 9/1969 | Bolick, Jr. | 179/100.1 DR |
| 3,541,271 | 11/1970 | Joslow et al. | 360/72 |
| 3,681,523 | 8/1972 | Sidline | 360/72 |
| 3,708,633 | 1/1973 | Nye et al. | 179/100.1 DR |
| 3,757,057 | 9/1973 | Fleming | 179/100.1 DR |
| 3,821,802 | 6/1974 | Nye et al. | 360/72 |
| 3,823,274 | 7/1974 | Matz | 179/100.1 DR |
| 3,903,369 | 9/1975 | Darwood | 360/72 |
| 3,946,437 | 3/1976 | Ono | 360/72 |

*Primary Examiner*—Alfred H. Eddelman
*Attorney, Agent, or Firm*—Arthur V. Smith

[57] ABSTRACT

Apparatus for indicating the farthest advance position of a bi-directionally movable medium is provided with a pulse generator mechanically coupled to the medium to generate pulses corresponding to incremental movements of the medium in either a first or second direction. The actual direction in which the medium moves is represented by respective first and second signals. A counter incrementally changes its count in response to each generated pulse when the medium moves in, for example, the second direction, and the counter reverses the direction in which it counts when the medium moves in the first direction following medium movement in the second direction so that the counter incrementally is restored to an initial count. Once the initial count of the counter is restored, an output farthest advance signal is produced indicating that the medium has reached its farthest advance position. In one embodiment, the apparatus is used to indicte the farthest advance of a movable web. When the web is reversed, the counter is decremented from an initial predetermined count. When the web subsequently is moved forward, the counter then is incremented. Once the web reaches the farthest advance position previously occupied prior to reverse movement thereof, the counter concurrently reaches its initial, predetermined count.

8 Claims, 2 Drawing Figures

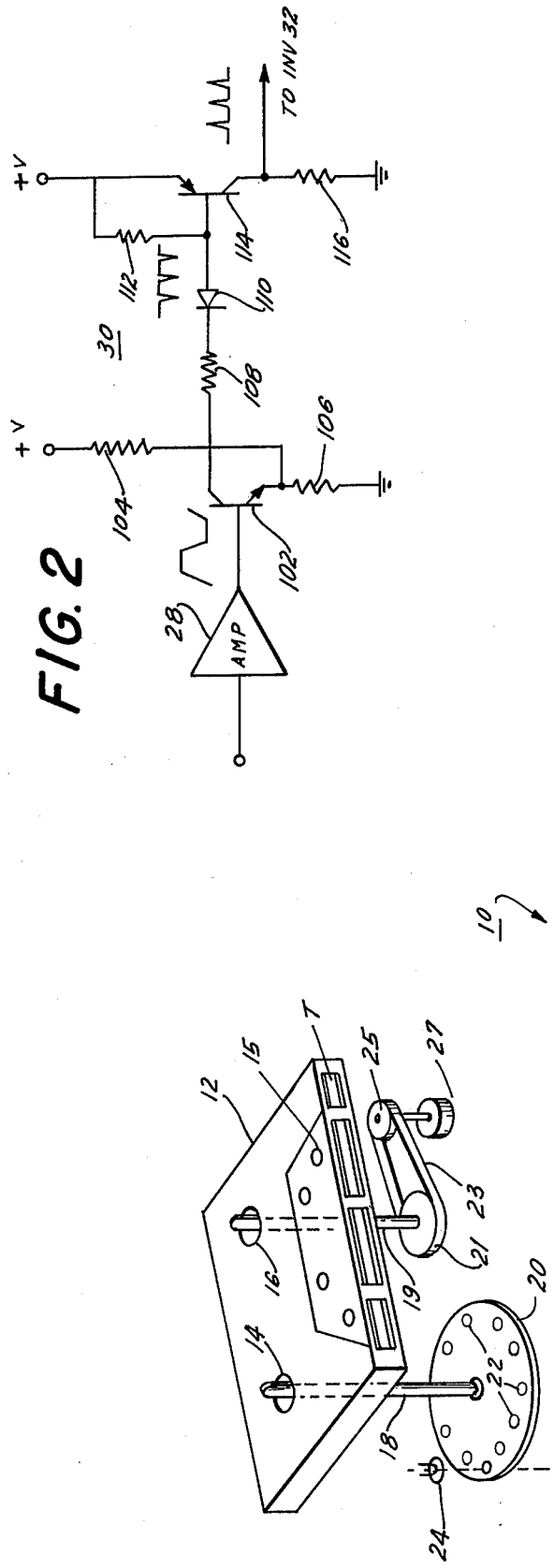
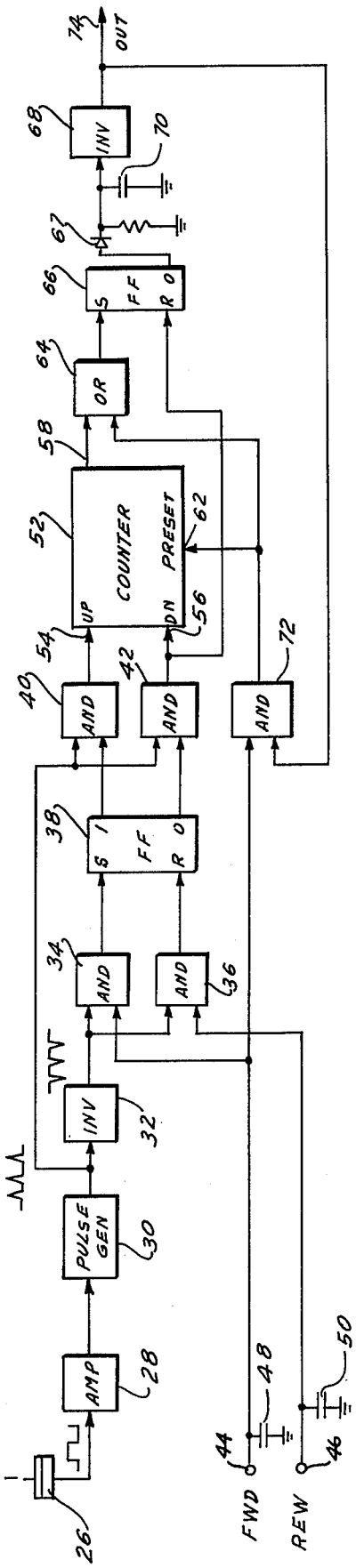
FIG. 2
FIG. 1

APPARATUS FOR INDICATING THE FARTHEST ADVANCE POSITION OF A BI-DIRECTIONALLY MOVABLE MEDIUM

BACKGROUND OF THE INVENTION

This invention relates to apparatus for indicating the farthest advance position of a bi-directionally movable medium and, more particularly, to solid-state electronic farthest advance apparatus which can be used, for example, in conjunction with a reversible web without requiring a direct sensing of the condition of the web.

In many processing systems, such as a web processing system, it often is necessary to bi-directionally move the web relative to a processing station. If the web is moved normally in a forward direction, it is desirable, once the web is reversed, to indicate when the web has been returned to its previous farthest advance position.

One type of web processing system wherein knowledge of the farthest advance position of the web is desirable is a dictating system. As one example, in a central dictation system, a central recording unit is adapted to be connected to individual ones of plural remote dictate stations. Once this connection is obtained, an operator at the remote station can dictate messages onto the recording medium at the central recording station and can control various functions, such as dictate, rewind, playback, and the like. In many applications using this central system, a subsequent operator at another remote station can dictate messages onto the recording medium following the completion of the dictation operation by the previous operator. It has been found that, in some instances, the last action taken by the previous operator prior to disconnecting his remote station from the central recording station is to partially review his dictated message. Hence, at the time of disconnection, the record medium has not been fully restored to the farthest advance position corresponding to the end of the dictated message. Therefore, to prevent the subsequent operator from dictating his message over the remaining portion of the previously dictated message, it is necessary to return the medium to its farthest advance position prior to effecting a connection between the remote station of the subsequent operator and the central recording station.

In a central dictation system of the type disclosed in U.S. Pat. No. 3,823,274, assigned to the assignee of the instant invention, the recording medium is an endless loop of magnetic tape capable of being stored in serpentine folds in a housing. A record/playback transducer is provided in the housing and the tape is driven bi-directionally past the transducer. During forward movement of the tape, as in a recording mode, the tape is drawn taut over various guide rollers. However, when the tape is reversed, this tautness is relaxed and a loop is formed between a set of guide rollers. Consequently, to determine whether the tape has reached its farthest advance position, it merely is necessary to sense the tautness of the tape. Thus, when all of the rewound tape has been transported in the forward direction, as during the playback of a previously recorded message, the tape once again is taut. As disclosed in U.S. Pat. No. 3,823,274, the tautness of the tape is sensed by a mechanical switch that is closed when the tape is rewound to form the loop and that is opened when the tape is taut, thereby indicating that the tape has been restored to its farthest advance position.

Although this technique of using a mechanical switch to detect the tape tautness as an indication of the farthest advance position is satisfactory for a central system provided with an endless loop of tape, it is not completely successful when used with other recording media. For example, if the recording medium is a magnetic tape housed in a cassette, reversal of the tape from its farthest advance position does not result in the formation of a tape loop as described above. Although the amount of tape payed out from the cassette supply reel onto the take-up reel can be sensed by measuring the diameter of the take-up reel and then sensing when this diameter is reduced, as during rewind, and subsequently restored to indicate that the tape has returned to its farthest advance position, such reel-measuring is highly inaccurate.

As another example, if the recording medium is a belt that is scanned by a traversing record/playback head, a review operation is performed by moving the head backward relative to the belt. Hence, farthest advance cannot be detected by sensing the tautness or slackness of the medium as disclosed in the aforenoted patent.

OBJECTS OF THE INVENTION

Therefore, it is an object of the present invention to provide improved apparatus for indicating the farthest advance position of a bi-directionally movable medium.

Another object of this invention is to provide farthest advance indicating apparatus which can be used in a recording system and which need not rely upon the formation of a loop in the recording medium.

A further object of this invention is to provide farthest advance indicating apparatus for use in a dictation system of the type using a web of recording medium.

An additional object of this invention is to provide farthest advance indicating apparatus wherein solid-state electronics are used to indicate when a recording tape is reversed from its farthest advance position and when that tape has been restored to its farthest advance position.

Yet another object of this invention is to provide apparatus for use in a dictation system employing a magnetic tape cassette wherein the farthest advance position of the tape is indicated.

Various other objects, advantages and features of this invention will become readily apparent from the ensuing detailed discussion, and the novel features will be particularly pointed out in the appended claims.

SUMMARY OF THE INVENTION

Apparatus for indicating the farthest advance position of a medium bi-directionally movable by a transport mechanism is provided with a pulse generator operable as a function of the movement of the medium to generate pulses as the medium moves either in a first or second direction, a counter coupled to the pulse generator and responsive to each pulse so as to incrementally change its count from an initial count, for example, to reduce its count, when the medium moves in the second direction and then to increase its count in response to each pulse when the medium reverses direction so as to move in the first direction, and an output device coupled to the counter and responsive to the restoration of the counter's initial count to produce a farthest advance signal indicating that the medium has returned to its farthest advance position.

BRIEF DESCRIPTION OF THE DRAWINGS

The following detailed description, given by way of example, will best be understood in conjunction with the accompanying drawings wherein:

FIG. 1 is a logic diagram of the farthest advance apparatus in accordance with the present invention; and FIG. 2 is a schematic diagram of a circuit used in the farthest advance apparatus shown in FIG. 1.

DETAILED DESCRIPTION OF A PREFERRED EMBODIMENT

Although the present invention can be used to indicate when virtually any bi-directionally movable device is moved away from the farthest position it last occupied and then is restored to that farthest position, the following description relates to the use of this invention with a bi-directionally movable web. Furthermore, as will now be described with reference to FIG. 1, this web here is a magnetic recording tape T bi-directionally driven between, for example, a supply reel and a take-up reel. To best illustrate the novel aspects of farthest advance indicating apparatus 10, it will be assumed that tape T is housed in a cassette 12 and is used in a recording/playback device, such as a dictation device. Although not necessary to a full understanding of this invention, the dictation device may be included in a central dictation system wherein dictated messages are recorded on tape T from individual ones of plural remote stations or, alternatively, the dictation device may be of the conventional so-called "desk-top" or individual type.

Referring now in greater detail in FIG. 1, cassette 12 houses supply and take-up reels and has apertures 14 and 16 that are adapted to receive drive spindles as well as aperture 15 that is adapted to receive a capstan, all included in a transport mechanism to drive the respective supply and take-up reels. One example of such a transport mechanism is shown as having supply reel drive spindle 18 inserted into aperture 14 of cassette 12 and take-up reel drive spindle 19 xnserted into cassette aperture 16 (the capstan is not shown). Take-up reel drive spindle 19 is secured to a drive member 21 which, in turn, is drivingly coupled by a belt 23 to a pulley 25, the latter being driven by a motor 27. In the illustrated arrangement, motor 27 is adapted to drive spindle 19 such that tape T is driven in a forward direction. Rewinding of tape T is effected by driving spindle 18 in an opposite direction by suitable apparatus (not shown). In one embodiment thereof, the tape transport mechanism is of the type disclosed in detail in co-pending application Ser. No. 768,704, filed Apr. 20, 1976, now U.S. Pat. No. 4,061,292 and assigned to the same assignee as the instant invention. Hence, the transport mechanism functions to move tape T in a forward direction, as during dictation, playback, or fast-forward, and in a reverse direction, as during high-speed rewind.

Supply reel drive spindle 18 is coupled to a reference disc 20 having reference elements 22 periodically spaced along the perimeter of the disc. Spindle 18 may be coupled directly to disc 20, as shown, or may be drivingly coupled to the disc by means of intermediate coupling members, such as drive belts, gears, friction rollers, or the like. In either embodiment, disc 20 is adapted to rotate as tape T is transported. More particularly, if tape T moves in a forward direction, that is, from its supply reel to its take-up reel, disc 20 rotates in a first direction, such as in a counterclockwise direction as viewed in FIG. 1. Conversely, if tape T is reversed, disc 20 correspondingly is reversed so as to rotate in, for example, the clockwise direction.

The function of elements 32 is to represent rotation of disc 20, and thus the movement of tape T. Accordingly, a transducer is provided to sense the passing of elements 22 past a fixed reference position. In one embodiment, elements 22 comprise uniformly spaced apertures in disc 20. Accordingly, the transducer used to sense such apertures comprises a light source 24 and a photoresponsive receptor 26. As one example thereof, light source 24 is comprised of a light emitting diode, an incandescent lamp, or the like. Similarly, photoresponsive receptor 26 may comprise a phototransistor, a photodiode, or other photoelectric device capable of generating an electrical output signal as a function of the light impinging thereon. As another alternative, disc 20 may comprise a slitted "chopper" disc, or a disc having thin elements radially extending therefrom. As another embodiment, elements 22 may comprise light reflective elements and photoresponsive receptor 26 may be disposed in a light reflective path extending from light source 24 to elements 22 and then reflected to the receptor. In all of these embodiments, it is appreciated that light emitted from light source 24 is communicated to photoresponsive receptor 26 along an optical path which is periodically interrupted by disc 20 as the disc rotates in synchronism with the movement of tape T. Accordingly, the output signal produced by photoresponsive receptor 26 is a generally pulse-shaped signal having a first transition when the light path between source 24 and receptor 26 first is interrupted and a second, opposite transition when that light path is resumed. Stated otherwise, the position and negative edges of the pulse signal are produced at each light-to-dark and dark-to-light transition of elements 22 in disc 20. It may be appreciated that various other reference devices can be used to produce a similar pulse signal. Thus, elements 22 may comprise uniformly spaced magnetic members and receptor 26 may be a corresponding detector, such as a Hall effect element. Other magnetic transducing devices can, of course, be used.

The output of receptor 26 is supplied through an amplifier 28 to a pulse generator 30. In one embodiment thereof, amplifier 28 may comprise a hysteresis amplifier adapted to supply pulse generator 30 with uniform pulses that are substantially unaffected by variations in the light-sensing characteristics of receptor 26 or the light-emitting characteristics of source 24 due to the aging of these elements, environmental conditions, or other external factors. Pulse generator 30 is adapted to produce a narrow pulse, such as in impulse, of predetermined polarity at each transition in the reference pulses applied thereto by amplifier 28 from receptor 26. As will soon be described, these impulses produced by pulse generator 30 are adapted to be selectively counted in a pulse counter 52. Accordingly, the output of pulse generator 30 is coupled to counter 52 via a steering circuit formed of coincidence gates, such as AND gates 40 and 42, respectively.

Counter 52 is a bi-directional, or UP/DOWN counter adapted to increment its count in response to pulses applied to an UP input terminal 54 and, conversely, to decrement its count in response to pulses applied to a DOWN input terminal 56. As illustrated, AND gates 40 and 42 apply the pulses generated by pulse generator 30 selectively to UP input terminal 54 and to DOWN input terminal 56 of counter 52, depending upon the direction in which tape T is moved in cassette 12 by the tape transport mechanism. For example, when tape T is reversed, pulses are applied to DOWN input terminal 56, whereby counter 52 counts down to decrement its count. Likewise, when tape T is driven in the forward direction, pulses are applied to UP input terminal 54, whereby counter 52 counts up to increment its count.

The apparatus used to selectively control AND gates 40 and 42 for this pulse steering function now will be described. When the tape transport mechanism is actuated to drive tape T forward, a corresponding FWD signal is produced. Also, when tape T is reversed, a REW signal is produced. These FWD and REW signals are produced by conventional devices (not shown), such as control switches, selector logic, and the like. The specific apparatus used to produce these FWD and REW signals forms no part of the present invention per se. It merely may be assumed that these signals are mutually exclusive so that when the FWD signal is produced the REW signal is not present and, conversely, when the REW signal is produced the FWD signal is not present. It will be assumed further that each of these FWD and REW signals is a positive potential and may be represented, in binary notation, as a binary "1". The FWD signal is adapted to be supplied to an input terminal 44 which, in turn, is coupled to one input of an AND gate 34. The REW signal is adapted to be applied to an input terminal 46 which is coupled to an input terminal of an AND gate 36.

As mentioned above, and as will be described in greater detail below, pulse generator 30 is adapted to produce impulses of predetermined polarity in response to transitions in the pulses applied thereto by amplifier 28. It will be assumed that such impulses are of positive polarity. Hence, the output signal supplied by pulse generator 30 normally is at a relatively low level except for the positive impulses. It will be recognized by those of ordinary skill in the art that such a relatively low voltage potential corresponds to a binary "0". The train of impulses is inverted by a logic inverter 32 and then supplied to another input of each AND gate 34 and 36. Accordingly, inverter 32 applies a signal that normally is a binary "1", except for periodic impulses, to AND gates 34 and 36. The output of AND gate 34 is connected to the set input terminal of a bistable multivibrator, such as a flip-flop circuit 38, and the output of AND gate 36 is connected to the reset input terminal of this flip-flop circuit. Thus, flip-flop circuit 38 will be set to its 1 state when the FWD signal coincides with the binary "1" produced by inverter 32, and the flip-flop circuit will be reset to its 0 state when the REW signal coincides with the binary "1" produced by inverter circuit 32. As shown, the 1 output terminal of flip-flop circuit 38 is connected to another input of AND gate 40 and the 0 output terminal of flip-flop circuit 38 is connected to another input of AND gate 38, one or the other of AND gates 40 and 42 is conditioned to supply the impulses produced by pulse generator 30 to UP input terminal 54 or DOWN input terminal 56, respectively, of counter 52. As will soon become apparent, the use of AND gates 34, 36, 40 and 42 and flip-flop circuit 38 prevents counter 52 from reversing its counting direction in the middle of an impulse.

Counter circuit 52 includes at least one output terminal 58. The counter circuit is of the type that provides a binary "1" at its output terminal 58 when its count is equal to an initial, or preset, value, and this binary "1" changes to a binary "0" when its count is, for example, decremented from that initial count. If desired, these binary notations may be reversed. Output terminal 58 is connected through an OR circuit 64 to the set input terminal of a flip-flop circuit 66. The reset input terminal of flip-flop circuit 66 is connected to AND gate 42. Hence, depending upon the count in counter circuit 52, flip-flop circuit 66 either is set to its 1 state or is reset to its 0 state. The 0 output terminal of flip-flop circuit 66 is connected through a diode 67 and an inverter 68 to an output terminal 74. A capacitor 70 is connected between the inverter input and ground so as to be charged when the flip-flop circuit is reset. When flip-flop circuit 66 subsequently is set, capacitor 70 provides a predetermined delay before a corresponding output signal is provided at output terminal 74 by inverter 68, this output signal being indicative of the fact that tape T has reached its farthest advance position. This farthest advance signal, which corresponds to a binary "1", is fed back to one input of an AND gate 72 to apply a preset signal to control input terminal 62 of counter circuit 52. The output of AND gate 72 also is applied through OR circuit 64 to the set input terminal of flip-flop circuit 66. As shown, the other input of AND gate 72 is adapted to be supplied with the FWD signal.

The manner in which farthest advance apparatus 10 operates to produce the farthest advance output signal at output terminal 74 now will be described. Let it be assumed that tape T is driven in the forward direction, as during a dictate operation, and that the farthest advance signal is provided at output terminal 74. Accordingly, the FWD signal is applied to terminal 44 and is gated in AND gate 72 with the farthest advance signal to preset counter circuit 52. Consequently, even though disc 20 rotates in synchronism with the forward movement of tape T, the resultant impulses produced by pulse generator 30 and applied to UP input terminal 54 of counter circuit 52 are not effective to increment the count of this counter circuit because of the presence of the preset input.

If an operator now wishes to review a portion of his previously dictated message, suitable controls (not shown) are operated and tape T is reversed. Accordingly, the FWD signal applied to terminal 44 terminates and the REW signal now is applied to terminal 46. Hence, AND gate 36 is conditioned to reset flip-flop circuit 38 to its 0 state when inverter 32 applies a binary "1" to AND gate 36. This resetting of flip-flop circuit 38 applies a binary "1" to AND gate 42 to condition this AND gate to supply the impulses produced by pulse generator 30 to DOWN input terminal 56 of counter 52. Since the FWD signal has terminated, AND gate 72 no longer applies the preset signal to counter circuit 52 and the count of this counter circuit is decremented in response to each impulse applied thereto as disc 20 rotates. It should be appreciated that, regardless of the direction of rotation of disc 20, amplifier 28 applies a substantially rectangular pulse signal to pulse generator 30.

The count exhibited by counter circuit 52 is decremented below its initial, or preset, count in response to the first impulse applied to DOWN input terminal 56. Hence, a binary "0" is provided at output terminal 58. Concurrently, the impulse applied by AND gate 42 to DOWN input terminal 56 also is applied to the reset input terminal of flip-flop circuit 66. Therefore, flip-flop circuit 66 is reset to charge capacitor 70 to the level of a binary "1" which is inverted by inverter 68 to terminate the farthest advance signal heretofore provided at output terminal 74.

Let it now be assumed that, after rewinding the desired amount of tape T, the operator plays back the rewound tape so as to review his dictated message. Tape T now is driven forward, and disc 20 rotates accordingly. Also, after suitable delays provided by capacitors 50 and 48, the REW signal at terminal 46 is terminated and the FWD signal again is applied to terminal 44. These delays, which preferably are in the REW and FWD signal generators (not shown) allow the motion due to inertia to terminate. Thence, AND gate 36 now is de-energized and AND gate 34 is conditioned by the FWD signal such that when inverter 32 applies a binary "1" thereto, flip-flop circuit 38 is set. Hence, the impulses produced by pulse generator 30 in response to each transition in the pulses applied by amplifier 28 as disc 20 rotates, are transmitted through now-conditioned AND gate 40 to UP input terminal 54 of counter 52. It is recognized that, when flip-flop circuit 38 is set, AND gate 42 no longer is conditioned to transmit impulses. Consequently, counter circuit 52 counts each impulse to increment its count toward its initial, preset count. Thus, depending upon the direction in which tape T is moved, counter circuit 52 either counts up or counts down in response to each impulse produced by pulse generator 30.

When tape T reaches its farthest position previously attained, that is, its farthest advance position, the total number of impulses counted up by counter circuit 52 will be equal to the total number of impulses which previously had been counted down. Consequently, counter circuit 52 will be restored to its initial, or preset, count. Therefore, a binary "1" is provided at counter output terminal 58 to set flip-flop circuit 66 to its 1 state. Consequently, capacitor 70 no longer is supplied with charging current, and thus discharges. After a predetermined delay(determined by the discharge time constant), the voltage across the capacitor discharges to a binary "0" level which, after being inverted by inverter 68, is the farthest signal. If desired, and in accordance with an alternative embodiment, capacitor 70 may be omitted. The farthest advance signal thus produced also is applied through AND gate 72 to preset counter circuit 52 and, additionally, through OR circuit 64 to insure that flip-flop circuit 66 is maintained in its 1 state. However, if desired, this additional latter function of the farthest advance signal may be omitted.

It should be noted that counter circuit 52 will increment its count in response to impulses produced by pulse generator 30 if tape T is advanced at a relatively slow speed, as during playback, or at a higher speed, as during fast-forward movement. In both modes of transporting tape T, the FWD signal is applied to terminal 44.

One of ordinary skill in the art will appreciate that the farthest advance signal produced at output terminal 74 can be used for various purposes. For example, in the event that communication between a dictate station and the recording station, as in a central dictation system, is terminated after an operator has reviewed only a portion of his previously dictated message, it is desired to return tape T to its farthest advance position prior to the time that the recording unit is made available for a subsequent dictating operation. Accordingly, the absence of a farthest advance signal at output terminal 74 is used to transport tape T at, for example, a fast-forward speed, when a disconnection between the dictate station and the recording station is sensed. When tape T reaches its farthest advance position to produce the farthest advance signal at output terminal 74, further movement of the tape is terminated and, moreover, the recording unit is made available for a subsequent connection to a dictate station. It is appreciated that, when tape T is driven at the fast-forward speed, the tape may continue to coast for a relatively short distance even after the transport mechanism is de-energized. This may be used to assure that a subsequent dictate operation will be sufficiently spaced from the previously recorded message.

Another use of the farthest advance signal provided at output terminal 74 is to permit an operator to advance tape T to its farthest advance position after reviewing a portion of a dictated message without listening to or concentrating on the remainder of that message. Thus, during a playback mode, tape T continues to advance until its farthest advance position is restored, whereupon the farthest advance signal is produced and the tape transport mechanism is de-energized to await further dictation by the operator. In this operation, capacitor 70 is advantageous in that it provides a brief delay between the time that tape T reaches its farthest advance position and the time that the farthest advance signal is produced to de-energize the tape transport mechanism. This delay insures that the operator can resume dictation without obliterating any of his previously recorded message. Similarly, if after reviewing a portion of his dictated message, the operator initiates a fast-forward tape movement, tape T is driven at the fast-forward speed until the tape returns to its farthest advance position, whereupon the farthest advance signal is produced to de-energize the tape transport mechanism.

Some alternative embodiments to the farthest advance apparatus 10 are contemplated. For example, the FWD and REW signals can be applied directly to AND gates 40 and 42, and AND gates 34 and 36 and flip-flop circuit 38 may be omitted. However, in the absence of AND gates 34 and 36 and flip-flop circuit 38, there is the possibility that, for example, the FWD signal is produced before disc 20 has completely stopped. This means that the FWD signal can be produced simultaneously with an impulse, whereby counter circuit 52 would be improperly incremented. However, by providing AND gates 34 and 36, the concurrent application of a FWD signal and an impulse to, for example, AND gate 34 will not be effective to change the state of flip-flop circuit 38. Thus, counter circuit 52 cannot be improperly incremented (or decremented) by reason of the concurrence of either the FWD signal or the REW signal and an impulse. Also, flip-flop circuit 38 insures that counter circuit 52 is incremented (or decremented) by an impulse produced when disc 20 coasts (as by inertia) even though the FWD (or REW) signal has terminated, thus preventing a "missed" impulse.

In the embodiment described above, it is assumed that counter circuit 52 is preset to an initial count from which the counter circuit is decremented when tape T is reversed. Thus, during a subsequent forward motion of tape T, counter circuit 52 will be restored to its preset count once tape T has reached its farthest advance position. In an alternative embodiment, counter 52 need not be preset to an initial count. Rather, each impulse produced by pulse generator 30 during forward movement of tape T can be used to increment the counter circuit even after the tape has reached its farthest advance position. When tape T is reversed, the highest count attained by the counter circuit is gated into a suitable storage device just prior to tape reversal. Then, the actual count of the counter circuit is compared to the highest count stored in the storage device. Of course, as tape T continues to be rewound, the count stored in the storage device will not compare to the count actually exhibited by the counter circuit. Also, as the direction of tape T is reversed and the counter circuit is incremented, its actual count still will not compare with the stored count until the tape arrives at its farthest position. At that time, a comparison is obtained between the stored count and the actual count, this comparison being used to produce the farthest advance signal.

It may be recognized that as the amount of tape on the supply reel is changed, the diameter thereof likewise changes and the rotary speed of disc 20 will increase (decrease during rewind tape movement). However, this has no effect upon the operation of the illustrated embodiment because, in returning to the farthest advance position, the same length of tape is moved forward as was moved backward. Hence, the same number of apertures 22 are counted. This effectively cancels any change in the rotary speed of disc 20.

One embodiment of pulse generator 30 now will be described with reference to the schematic diagram shown in FIG. 2. The pulse generator is formed of complementary transistors 102 and 114. A voltage divider circuit including resistors 104 and 106 is provided between a source of operating potential +V and a reference potential, such as ground. The output of this voltage divider circuit is connected to the emitter of transistor 102 to apply a predetermined bias voltage thereto. The collector of transistor 102 is connected through a resistor 108 and a rectifier 110 to the base of transistor 114. The emitter of transistor 114 is connected directly to the source +V and its base is connected to the source through a bias resistor 112. As shown, the collector of transistor 114 is connected to ground through a load resistor 116, the output of pulse generator 30 being derived from the collector of transistor 114.

In operation, the base of transistor 102 is connected to amplifier 28 so as to receive the pulses produced in response to the rotation of reference disc 20 as tape T moves. As exaggerated in FIG. 2, the leading and trailing edges of these pulses are not absolutely perpendicular and, therefore, exhibit some degree of slope. When the leading edge of this pulse exceeds the bias voltage at the emitter of transistor 102 (plus the base-emitter voltage), transistor 102 is turned on and is driven toward saturation. Consequently, the collector voltage, which previously had been equal to the source voltage +V, applied through resistor 112, rectifier 110 and resistor 108, rapidly decreases to approximately the emitter bias voltage of transistor 102.

One of ordinary skill in the art will appreciate that the base-collector junction of a transistor may be considered as including a diode poled to be reverse biased when the collector voltage exceeds the base voltage. However, as the leading edge of the pulse signal applied to transistor 102 continues to increase, this diode becomes forward biased. Hence, the voltage at the collector of transistor 102, which had been reduced to a lower level, now is driven in the positive direction by the increasing voltage applied to the base of this transistor. Therefore, the collector voltage of transistor 102 normally exhibits a higher voltage level, except during brief intervals that coincide with a portion of the rise time, or leading edge, of the pulses applied to the transistor.

A similar phenomenon occurs at the trailing edge of the pulse applied by amplifier 28. Thus, as this trailing edge decreases, transistor 102 is driven out of saturation and its base-collector diode becomes reverse biased. Accordingly, the collector voltage of transistor 102 is reduced for a brief interval, or until its base voltage no longer exceeds the bias voltage applied to its emitter (plus the base-emitter voltage). At that time, transistor 102 is turned off. Hence, it is appreciated that the collector voltage of transistor 102 appears as a series of negative-going impulses corresponding to the leading and trailing edges of the pulse signal applied thereto by amplifier 28.

These negative-going impulses are inverted by transistor 114 and then supplied to the remaining circuitry illustrated in FIG. 1.

While the present invention has been particularly shown in conjunction with a preferred embodiment thereof, it should be apparent that various modifications in form and details can be made without departing from the spirit and scope of the invention. Some of these modifications and alternative embodiments have been described hereinabove. As another modification, counter 52 may be of the type having a second output terminal whereat a signal, such as a binary "1", is provided when the count exhibited by counter 52 changes from its initial count. This signal, rather than the signal produced by AND gate 42, can be used to reset flip-flop circuit 66.

In addition, it should be recognized that, although this farthest advance apparatus can be used advantageously with a bi-directionally movable web, such as a tape housed in a cassette, or driven from one reel to another, or forming an endless tape loop, the apparatus also can be used to indicate the farthest advance position of any other medium or bi-directionally movable device. Furthermore, although one preferred embodiment of pulse generator 30 has been shown and described, it is apparent that various other pulse generators can be used, if desired, to produce relatively narrow pulse signals corresponding to the transitions sensed by a suitable transducer as reference disc 20 is driven.

Therefore, it is intended that the appended claims be interpreted as including the foregoing as well as other such changes and modifications.

What is claimed is:

1. Apparatus for indicating the farthest advance position of a medium bi-directionally movable by a transport mechanism, comprising:
    means for providing a first signal when said transport mechanism is actuated to move said medium in a first direction;
    means for providing a second signal when said transport mechanism is actuated to move said medium in a second direction opposite to said first direction;
    pulse generating means operable with said transport mechanism to generate pulses representing the amount that said medium moves either in said first or in said second direction;
    bi-directional counting means selectively responsive to each generated pulse to incrementally change the count thereof in a first or second direction;
    gating means for coupling said generated pulses to said counting means when said medium moves in said second direction so that said counting means incrementally changes its count from an initial count and in a first direction and for coupling said generated pulses to said counting means when said medium moves in said first direction following movement in said second direction so that said counting means incrementally changes its count in a second direction so as to be restored to said initial count;

gate control means responsive to said first and second signals and to said generated pulses for energizing said gating means when said first or second signal is initiated in non-coincidence with a generated pulse and for maintaining said gating means energized if said first or second signal terminates but said pulses continue to be generated; and output means for producing a farthest advance signal when said counting means is restored to said initial count and for maintaining said farthest advance signal until said medium subsequently is moved in said second direction.

2. The apparatus of claim 1 wherein said pulse generating means comprises reference means movable in synchronism with said medium; sensing means for sensing the passage of said reference means past a sensing location and for generating pulses in response thereto; and pulse shaping means coupled to said sensing means for shaping said pulses to a predetermined configuration.

3. The apparatus of claim 2 wherein said sensing means comprises a light source in fixed position, and photoresponsive means in optical communication with said light source for producing an output proportional to the amount of light impinging thereon; said reference means comprises a disc rotatable in synchronism with said movement of said medium, said disc having spaced apart portions that are periodically interposed in the optical path between said light source and said photoresponsive means to correspondingly modulate the light impinging on said photoresponsive means; and said pulse shaping means comprises transition sensing means for sensing transistions in the output pulses produced by said photoresponsive means and producing a transition pulse at each sensed transition.

4. The apparatus of claim 3 wherein said transition sensing means comprises first transistor means having base electrode means supplied with said output pulses produced by said photoresponsive means, emitter electrode means supplied with a predetermined bias potential, and collector electrode means direct coupled through rectifier means to base electrode means of second transistor means; and an output terminal direct coupled to said second transistor means whereat said transition pulses are derived.

5. The apparatus of claim 1 wherein said counting means comprises a reversible pulse counter having a first input for receiving pulses to increment the count thereof, a second input for receiving pulses to decrement the count thereof, and at least one output for providing a representation of said count; and said gating means is coupled to said pulse generating means and is energized by said gate control means when the latter is responsive to said first signal for applying said pulses to said first input of said counter and is energized by said gate control means when the latter is responsive to said second signal for applying said pulses to said second input of said counter.

6. The apparatus of claim 5 wherein said counter includes an output for producing a first counter output signal when said counter is incremented to a predetermined count and a second counter output signal when said count is other than said predetermined count; and further comprising inhibit means coupled to said counter and responsive to said first counter output signal for inhibiting said counter from being further incremented by said pulses.

7. The apparatus of claim 5 wherein said gate control means comprises a first AND gate for receiving said first signal, a second AND gate for receiving said second signal, logic inverter means for supplying inverted pulses to said first and second AND gates, and bi-state means responsive to the first inverted pulse transmitted by said first AND gate for assuming a first state and responsive to the first inverted pulse transmitted by said second AND gate for assuming a second state, said first state energizing said gating means to apply succeeding non-inverted pulses to said first input of said counter and said second state energizing said gating means to apply succeeding non-inverted pulses to said second input of said counter.

8. Apparatus for indicating the farthest advance position of a bi-directionally driven web, comprising
means for providing a first signal when said web is driven in a forward direction;
means for providing a second signal when said web is driven in a reverse direction;
a member rotatable in synchronism with said web and having periodically spaced reference portions;
sensing means fixedly disposed for sensing the passage therepast of each of said reference portions of said member and for generating reference pulses in response thereto;
UP/DOWN counting means having a count up input for receiving reference pulses to increment the count of said counting means in response to each said pulse applied thereto, a count down input for receiving reference pulses to decrement the count of said counting means in response to each said pulse applied thereto, and output means for producing a first counter output signal when the count of said counting means is a predetermined count and for producing a second counter output signal when said count is not said predetermined count;
a first AND gate responsive to said first signal for applying said reference pulses to said count up input of said counting means;
a second AND gate responsive to said second signal for applying said reference pulses to said count down input of said counting means;
farthest advance signal means responsive to said first counter output signal for producing a farthest advance signal indicating that said web has reached its farthest advance position; and
counter inhibit means responsive to said farthest advance signal for inhibiting said counting means from being incremented beyond said predetermined count while said farthest advance signal is produced.

* * * * *